United States Patent [19]

Cuthbertson et al.

[11] Patent Number: 5,524,227
[45] Date of Patent: Jun. 4, 1996

[54] METHOD AND SYSTEM FOR FORMATTING ADDRESS STRINGS INTO RECOGNIZABLE TOKEN SEQUENCES

[75] Inventors: Robert J. Cuthbertson; Jianhua Zhu, both of Lafayette; Rodolphe J. Nassif, Louisville; Patrick Pfeffer, Lafayette; Srdjan N. Kovacevic, Westminster, all of Colo.

[73] Assignee: U S WEST Technologies, Inc., Boulder, Colo.

[21] Appl. No.: 282,863

[22] Filed: Jul. 29, 1994

[51] Int. Cl.⁶ .............................. G06F 12/10; G06F 17/30
[52] U.S. Cl. .............................. 395/412; 395/600
[58] Field of Search ..................... 395/600, 650, 395/700, 425, 412, 416; 364/478

[56] References Cited

U.S. PATENT DOCUMENTS

| | | | |
|---|---|---|---|
| 4,355,913 | 10/1982 | Rutkowski, Jr. | 400/63 |
| 4,567,590 | 1/1986 | Bederman | 370/85.15 |
| 4,771,391 | 9/1988 | Blasbalg | 364/514 C |
| 4,958,377 | 9/1990 | Takahashi | 382/34 |
| 5,140,644 | 8/1992 | Kawaguchi et al. | 382/10 |
| 5,179,698 | 1/1993 | Bachman et al. | 395/600 |
| 5,420,403 | 5/1995 | Allum et al. | 235/375 |
| 5,422,821 | 6/1995 | Allen et al. | 364/478 |
| 5,439,564 | 2/1996 | Mullan | 370/54 |

*Primary Examiner*—Thomas G. Black
*Assistant Examiner*—Peter Y. Wang
*Attorney, Agent, or Firm*—Brooks & Kushman

[57] ABSTRACT

A method and system are disclosed for formatting address strings into a recognizable sequence of token types for database processing. The system includes a token rule processor and a token sequence processor. The method begins with the step of assigning token types to components of an address string to form a sequence of token types. The method next includes the step of determining whether or not the sequence of token types is contained in an adjustable predetermined rule table. The method further includes the step of processing the sequence of token types into a recognizable sequence format if the sequence of token types is contained in the rule table. Finally, the method concludes with the step of processing the sequence of token types into a recognizable sequence format in accordance with a predetermined interpretation procedure if the sequence of token types is not contained in the rule table.

15 Claims, 4 Drawing Sheets

METHOD AND SYSTEM FOR FORMATTING ADDRESS STRINGS INTO RECOGNIZABLE TOKEN SEQUENCES

TECHNICAL FIELD

This invention relates generally to database processing. More particularly, this invention relates to a method and system for formatting address strings into a recognizable sequence of token types for database processing utilizing a predetermined token sequence rule table and a flexible interpretation procedure.

BACKGROUND ART

An entity having a customer database often needs to verify the street address of the customer for various reasons, such as dispatching a technician to the correct address or sending a bill to the correct address. An automated process is needed to decompose street addresses into meaningful sub-components, such as house number, street name, apartment or suite number, etc. This is a challenging task due to the fact that there are numerous ways in which addresses can be written. Some of the difficulties include variations in sub-component ordering, omission of street directionals, thoroughfare codes used as legal street names, etc.

There are several methods that address this need. One known method is the grammar-based method. This method provides a predetermined format defining how a street address should be written. This system, however, has limited capability since it recognizes addresses written in a style adhering to a set of strict rules regarding mandatory components and their ordering. As a result, this method only recognizes addresses that fit the predetermined format.

A second known method is the table-driven method. The table-driven method defines a fixed set of token types. Words in address strings are each assigned a token type to form a token sequence. A customizable conversion table is then used by the address processor to change one or more token types in the token sequence. However, if a word in the address string is not listed in the table, the system cannot process that word. Another limitation of this method is that the conversion table can be very large and, thus, very costly to build and maintain.

A third known method is the utilization of a hard-wired program coded to convert address strings into various components. However, this method can be very complex in order to handle all the different variations of writing a street address. This system is also costly to build. Once built, adding ability to recognize additional addresses or changing the way to recognize some addresses is very difficult.

The known prior art fails to disclose a flexible method of recognizing variations in writing street addresses. The known prior art also fails to disclose a customizable method of recognizing unlimited variations in the way street addresses are written.

DISCLOSURE OF THE INVENTION

It is thus a general object of the present invention to provide a method and system for formatting the components of an address in the form of an address string into a recognizable token sequence for database processing.

In carrying out the above object, a method is provided for formatting an address string into a recognizable token sequence. The method begins with the step of providing a token table of predetermined token types.

The method continues with the step of comparing the components of the address string to the token table and assigning corresponding token types thereto to form a corresponding first arbitrary sequence of token types.

The method includes the step of comparing the first arbitrary sequence of token types to an adjustable predetermined rule table having a corresponding first set of rules for selected sequences of token types to determine whether the first arbitrary sequence of token types is contained in the rule table.

The method also includes the step of processing the first arbitrary sequence of token types in accordance with the corresponding first set of rules to convert the first arbitrary sequence of token types into a recognizable sequence format if the first arbitrary sequence is one of the selected sequences contained in the rule table.

Finally, the method concludes with the step of processing the first arbitrary sequence of token types in accordance with a predetermined interpretation procedure to convert the first arbitrary sequence of token types into a recognizable sequence format if the first arbitrary sequence is not one of the selected sequences contained in the rule table.

In further carrying out the above object and other objects of the present invention, a system is also provided for carrying out the steps of the above described method. The system includes a memory and a token table of predetermined token types stored in the memory.

The system also includes a first comparator for comparing the components of the address string to the token table and assigning corresponding token types thereto to form a corresponding first arbitrary sequence of token types.

The system further includes a second comparator for comparing the first arbitrary sequence of token types to an adjustable predetermined rule table stored in the memory. The adjustable predetermined rule table includes a corresponding first set of rules for selected sequences of token types to determine whether the first arbitrary sequence of token types is contained in the rule table.

The system includes a first processor for processing the first arbitrary sequence of token types in accordance with the corresponding first set of rules to convert the first arbitrary sequence of token types into a recognizable sequence format if the first arbitrary sequence is one of the selected sequences contained in the table.

And finally, the system includes a second processor for processing the first arbitrary sequence of token types in accordance with a predetermined interpretation procedure to convert the first arbitrary sequence of token types into a recognizable sequence format if the first arbitrary sequence is not one of the selected sequences contained in the rule table.

The second processor of the system includes a second set of rules defining the assignment of token types to the components of the address string. The second set of rules are stored in the memory.

The second processor also includes a third comparator for comparing the components of the address string to the token table and assigning corresponding token types thereto in accordance with the second set of rules to form a corresponding second arbitrary sequence of token types.

The second processor further includes a third processor for processing the second arbitrary sequence of token types in accordance with a predetermined third set of rules to convert the second arbitrary sequence of token types into a recognizable sequence format. The third set of rules is stored in the memory.

The above objects, features and advantages of the present invention, as well as others, are readily apparent from the following detailed description of the best mode for carrying out the invention when taken in connection with the accompanying drawings.

BRIEF DESCRIPTION OF THE DRAWINGS

The present invention will be apparent from the detailed description taken in conjunction with the accompanying drawings in which.

BEST MODE FOR CARRYING OUT THE INVENTION

Figure 1:
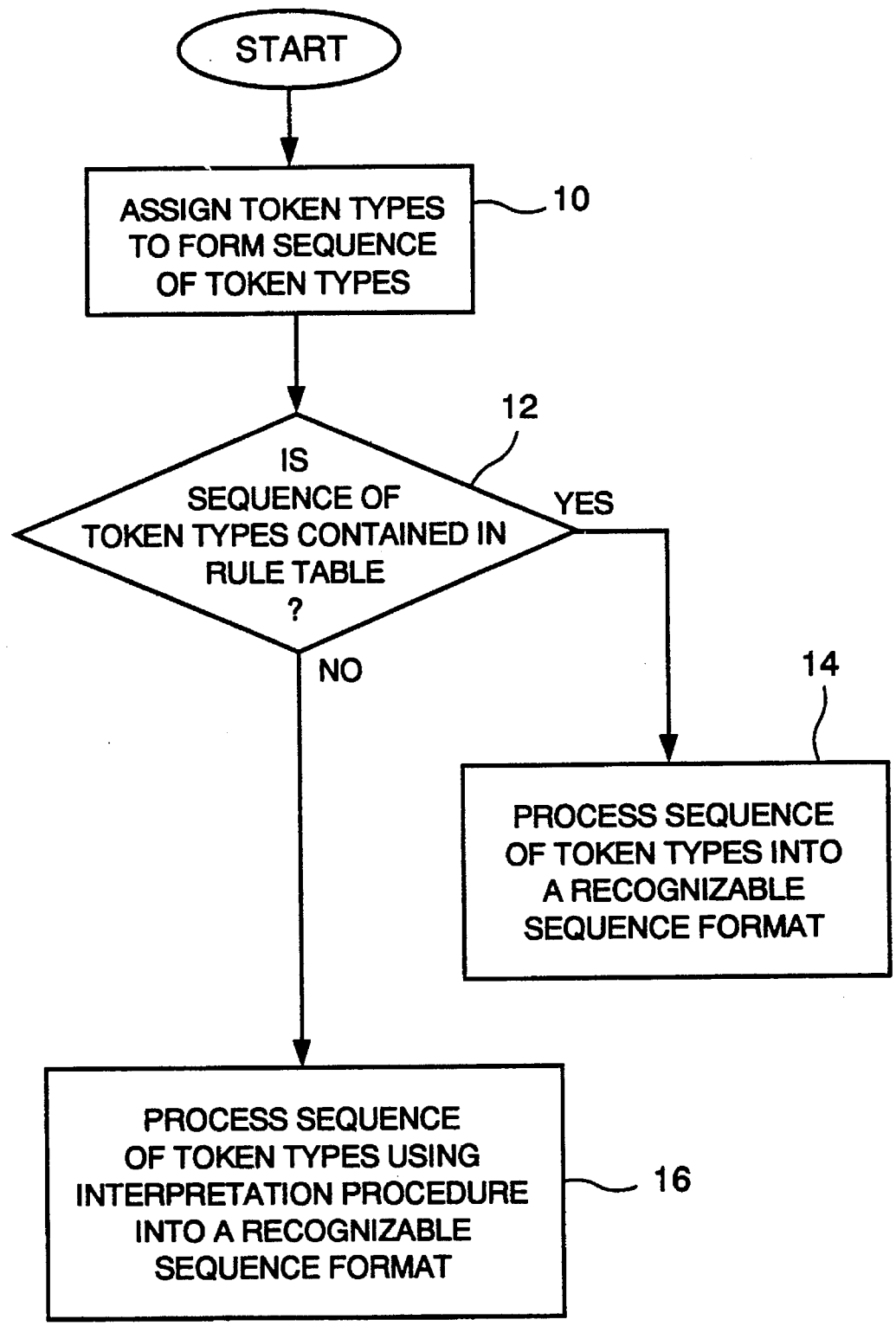
FIG. 1 is a flow chart of the method utilized in accordance with the present invention.

Referring now to the drawings, FIG. 1 illustrates the method of the present invention. The method begins with the step of assigning token types to components of an address string to from a sequence of token types as shown by block 10.

Next, conditional block 12 illustrates the second step of the method, determining whether or not the sequence of token types is contained in an adjustable predetermined rule table.

As shown by block 14, if the sequence of token types is contained in the rule table, the sequence is processed into a recognizable format.

If the sequence of token types is not contained in the rule table, the sequence is processed into a recognizable sequence format utilizing a predetermined interpretation procedure, as shown by block 16.

Figure 2:
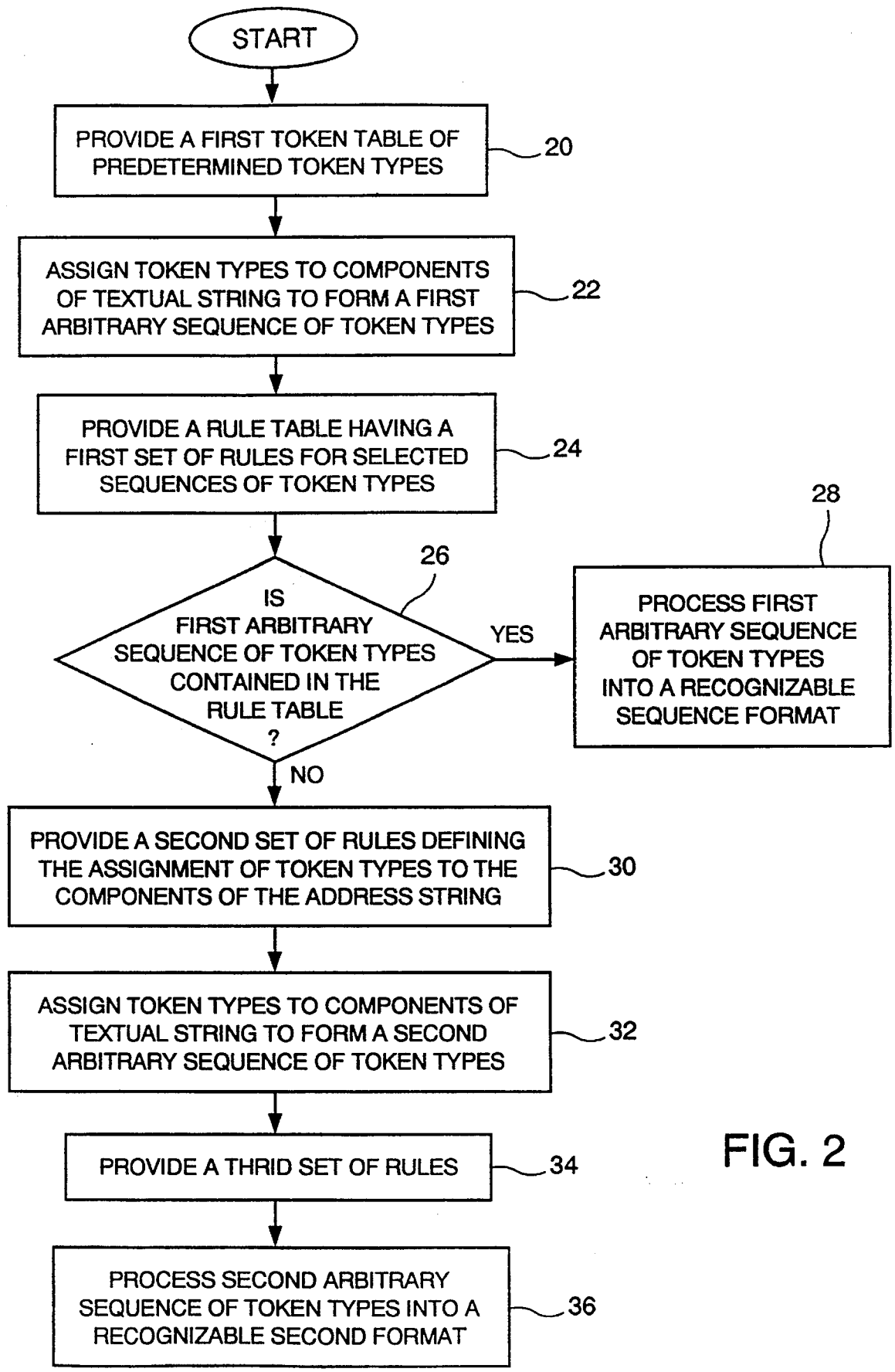
FIG. 2 is a detailed flow chart illustrating the sequence of steps performed in the method of the present invention.

The method of the present invention is illustrated in more detail in FIG. 2. The first step of the method of the present invention includes providing a first token table of predetermined token types, as shown by block 20.

The token table defines what token type is to be assigned to various components of an address. The table below gives examples of token types that are to be assigned to various components of an address:

| Address Component | Token Type |
| --- | --- |
| Alphabetic | B |
| Numeric | N |
| 5-Digit Numeric | z |
| Thoroughfare-code (e.g., St., Ave.) | T |
| Directional (e.g., East, West) | R |
| Unit Indicator (e.g., Suite, Apt.) | U |
| State-name | S |

The first token table also contains all variations for the above components. For example, "Avenue", "Ave.", and "Av." would all be contained in the table and be assigned token type "T".

Next, block 22 illustrates the second step of the method, comparing the components of the address string to the first token table and assigning corresponding token types thereto to form a corresponding first arbitrary sequence of token types. For example, using the table given above, an address consisting of "1234 S Moran Street Pkwy Denver Colo. 56789 Suit 102" would form a sequence of token types represented by "NRBTTBSzUN".

The next step, as shown by block 24, includes providing a rule table having a first set of rules for selected sequences of token types. These selected sequences comprise the many possible ways an address can be written. For each selected sequence listed in the rule table, there is a corresponding rule defining a recognizable sequence format for the sequence of token types. For example, if the sequence of token types "NRBTTBSzUN" as illustrated above is listed in the rule table its predefined recognizable sequence format would be "ndbt-cszum". The dash "-" indicates that the corresponding token is to be ignored.

Several selected sequences may have the same recognizable sequence format. For example, a sequence of token types in the form of "NRBBRBSzUN" may also be assigned the predefined recognizable sequence format of "ndbt-cszum". In addition, each selected sequence may have alternative recognizable sequence formats available whereby the alternative sequence formats are listed to reflect a predetermined preference.

Next, as shown by conditional block 26, the first arbitrary sequence of token types is compared to the adjustable predetermined rule table having a corresponding first set of rules for selected sequences of token types to determine whether the first arbitrary sequence of token types is contained in the rule table.

If the first arbitrary sequence of token types is one of the selected sequences contained in the rule table, the first arbitrary sequence of token types is processed in accordance with the corresponding first set of rules to convert the first arbitrary sequence of token types into a recognizable sequence format, as shown by block 28.

If the first arbitrary sequence of token types is not one of the selected sequences contained in the rule table, the first arbitrary sequence of token types is processed in accordance with a predetermined interpretation procedure to convert the first arbitrary sequence of token types into a recognizable sequence format, as shown by block 16 of FIG. 1.

Blocks 30–36 represent the step of processing the sequence of token types in accordance with the predetermined interpretation procedure. First, as shown by block 30, a predetermined second set of rules is provided defining the assignment of token types to the components of the address string. The second set of rules define which token type is to be assigned to the components of the address string. For example, an alphabetic token is to be assigned to the street name or it could be assigned to the community name. The assignment of each token type may be ranked in accordance with a predetermined priority. For example, if it is equally plausible to assign a token type representing an alphabetic name to either the street name or the community name, the street name would take precedence.

Next, as shown by block 32, the components of the textual string are compared to the token table and assigned corresponding token types thereto in accordance with the second set of rules to form a corresponding second arbitrary sequence of token types. For example, the address illustrated above may be assigned a sequence of token types in the form of "NRBBTBSzUN".

A third set of rules is provided as shown by block 34. The third set of rules includes recognizable sequence formats for various sequences of token types. The sequences of token types contained in the third set of rules represent all possible ways of writing an address.

Finally, the second arbitrary sequence of token types is processed in accordance with the predetermined third set of rules to convert the second arbitrary sequence of token types into a recognizable sequence format, as shown by block 36.

In accordance with a further aspect of the invention, the interpretation procedure can be designed to perform backtracking. In other words, it is possible for the interpretation procedure to rearrange the assignment of token types of the second arbitrary sequence in a subsequent stage of the procedure if the previous assignment fails to provide a recognizable sequence format.

Figure 3:
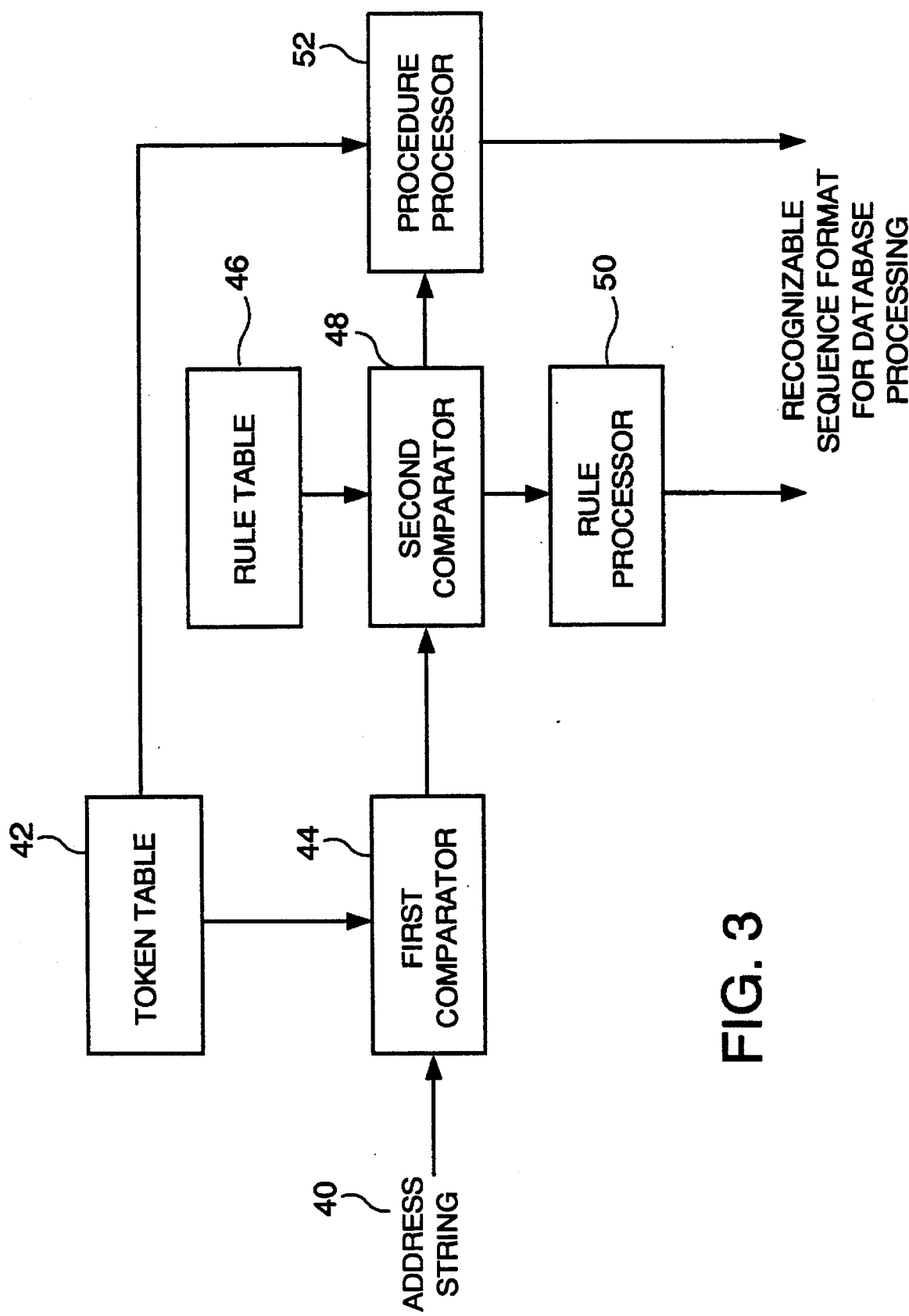
FIG. 3 is a block diagram of the preferred embodiment of the present invention.

Turning now to FIG. 3, a block diagram of the preferred embodiment of the present invention is illustrated. The system for formatting the components of an address in the form of an address string 40 into a recognizable token sequence for database processing includes a token table 42. The token table 42 consists of predetermined token types, as illustrated above.

The system also includes a first comparator 44, coupled to the token table 42, for comparing the components of the address string 40 to the token table 42 and assigning corresponding token types thereto to form a corresponding first arbitrary sequence of token types. In the preferred embodiment, the first comparator 44 is a lexical analyzer.

The system further includes an adjustable predetermined rule table 46. The rule table 46 includes a first set of rules for selected sequences of token types.

A second comparator 48, coupled to the first comparator 44 and the rule table 46, is provided for comparing the first arbitrary sequence of token types to the rule table 46 to determine whether the first arbitrary sequence of token types is contained in the rule table 46.

Coupled to the second comparator 48 is a first processor 50 for processing the first arbitrary sequence of token types in accordance with the corresponding first set of rules to convert the first arbitrary sequence of token types into a recognizable sequence format if the first arbitrary sequence is one of the selected sequences contained in the rule table 46.

A second processor 52, coupled to the token table 42 and the second comparator 48, is provided for processing the first arbitrary sequence of token types in accordance with a predetermined interpretation procedure to convert the first arbitrary sequence of token types into a recognizable format if the first arbitrary sequence is not one of the selected sequences contained in the rule table 46.

Figure 4:
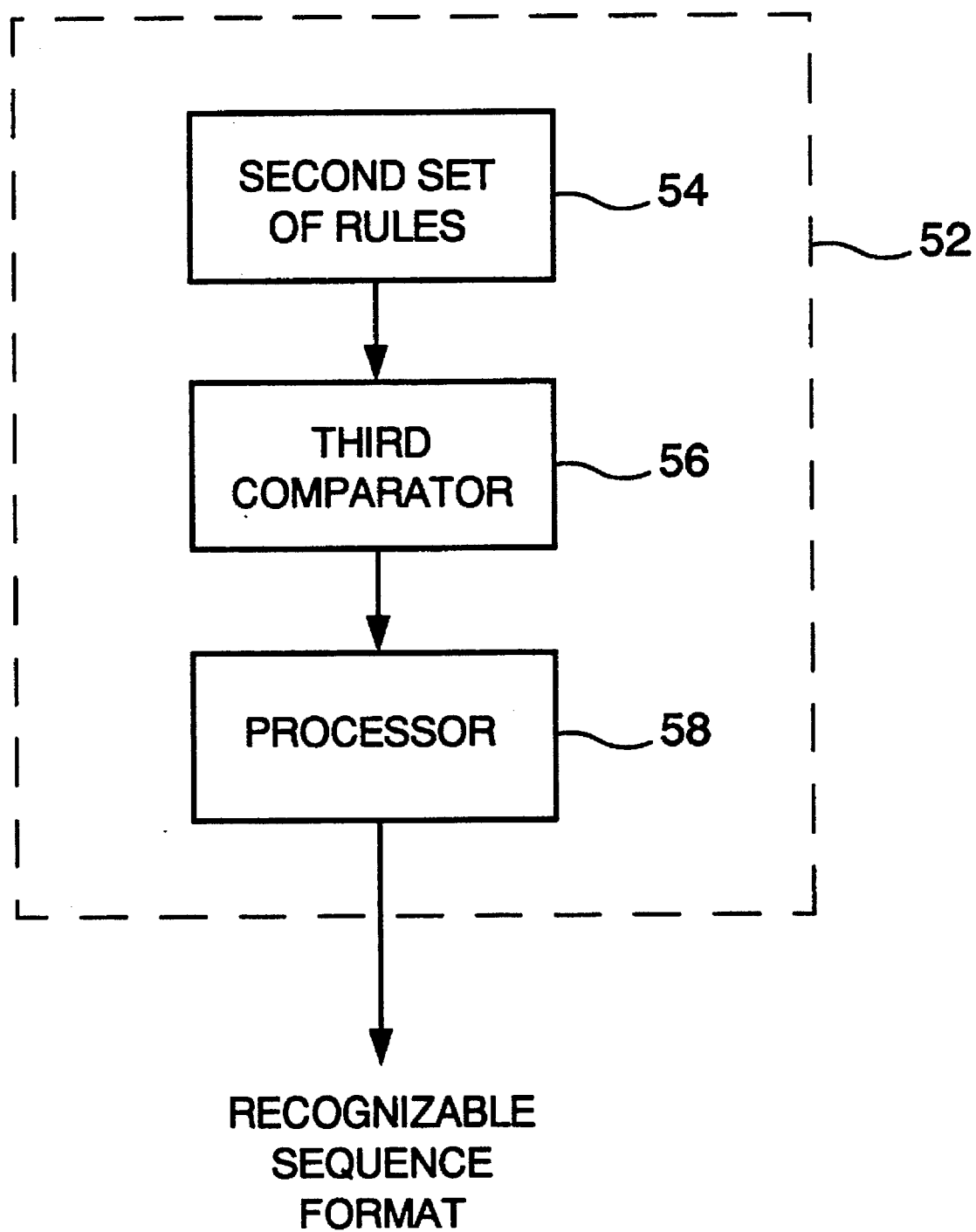
FIG. 4 is a block diagram of the second processor of the present invention.

The second processor 52, shown in FIG. 4, includes a second set of rules 54. The second set of rules 54 define the assignment of token types to the components of the address string 40.

The second processor 52 also includes a third comparator 56. The third comparator 56 compares the components of the address string 40 to the token table 42 and assigns corresponding token types thereto in accordance with the second set of rules 54 to form a corresponding second arbitrary sequence of token types.

And finally, the second processor 52 includes a third processor 58 for processing the second arbitrary sequence of token types in accordance with a predetermined third set of rules to convert the second arbitrary sequence of token types into a recognizable sequence format.

While the best mode for carrying out the invention have been described in detail, those familiar with the art to which this invention relates will recognize various alternative designs and embodiments for practicing the invention as defined by the following claims.

What is claimed is:

1. A computerized method for formatting the components of an address in the form of an address string into a recognizable token sequence for database processing, the method comprising:

providing a memory;

storing a token table into the memory, the token table having predetermined token types;

storing a rule table into the memory, the rule table having a first plurality of rules corresponding to a plurality of selected sequences of token types;

comparing the components of the address string to the token table and assigning corresponding token types thereto to form a corresponding first sequence of token types;

comparing the first sequence of token types to the rule table to determine whether the first sequence of token types correspond to one of the plurality of selected sequences of token types contained in the rule table;

processing the first sequence of token types in accordance with one of the first plurality of rules to convert the first sequence of token types into a recognizable sequence format if the first sequence of token types correspond to one of the plurality of selected sequences of token types contained in the rule table; and processing the first sequence of token types in accordance with a predetermined interpretation procedure to convert the first sequence of token types into a recognizable sequence format if the first sequence of token types do not correspond to one of the plurality of selected sequences of token types contained in the rule table.

2. The method of claim 1, wherein the step of processing the first sequence of token types in accordance with the predetermined interpretation procedure comprises:

storing a second plurality of rules defining the assignment of token types to the components of the address in the memory;

storing a third plurality of rules in the memory;

comparing the components of the address string to the token table and assigning corresponding token types thereto in accordance with the second plurality of rules to form a corresponding second sequence of token types;

processing the second sequence of token types in accordance with the third plurality of rules to convert the second sequence of token types into a recognizable sequence format.

3. The method of claim 1, wherein the first plurality of rules include alternative recognizable sequence formats.

4. The method of claim 3, wherein the alternative recognizable sequence formats are arranged in a preferential order.

5. The method of claim 2 wherein the third plurality of rules include recognizable sequence formats for various possible sequences of token types.

6. The method of claim 2, wherein the assignment of each token type is ranked in accordance with a predetermined priority.

7. The method of claim 6 wherein the interpretation procedure performs back-tracking.

8. A system for formatting the components of an address in the form of an address string into a recognizable token sequence for database processing, the system comprising:

a first memory;

a token table having predetermined token types, the token table stored in the first memory;

a rule table having a first plurality of rules corresponding to a plurality of selected sequences of token types, the rule table stored in the first memory;

a first comparator for comparing the components of the address string to the token table and assigning corresponding token types thereto to form a corresponding first sequence of token types;

a second comparator for comparing the first sequence of token types to the rule table to determine whether the first sequence of token types correspond to one of the plurality of selected sequences of token types contained in the rule table;

a first processor for processing the first sequence of token types in accordance with one of the first plurality of rules to convert the first sequence of token types into a recognizable sequence format if the first sequence of token types correspond to one of the plurality of selected sequences of token types contained in the table; and a second processor for processing the first sequence of token types in accordance with a predetermined interpretation procedure to convert the first sequence of token types into a recognizable sequence format if the first sequence of token types do not correspond to one of the plurality of selected sequences of token types contained in the rule table.

9. The system of claim 8, wherein the second processor comprises:

a second memory;

a second plurality of rules defining the assignment of token types to the components of the address stored in the second memory;

a third comparator for comparing the components of the address string to the token table and assigning corresponding token types thereto in accordance with the second plurality of rules to form a second sequence of token types;

a third processor for processing the second sequence of token types in accordance with the third plurality of rules to convert the second arbitrary sequence of token types into a recognizable sequence format.

10. The system of 8 wherein the first comparator is a lexical analyzer adapted to decompose the components of the address string into tokens in accordance with the token table.

11. The system of claim 8 wherein the first plurality of rules include alternative recognizable sequence formats.

12. The system of claim 11 wherein the alternative recognizable sequence formats are arranged in a preferential order.

13. The system of claim 9 wherein the third plurality of rules include recognizable sequence formats for various possible sequences of token types.

14. The system of claim 9 wherein the assignment of each token type is ranked in accordance with a predetermined priority.

15. The system of claim 14 wherein the interpretation procedure performs back-tracking.

\* \* \* \* \*